J. C. BELL.
PLANER FEED GEAR.
APPLICATION FILED JUNE 26, 1915.
1,161,592.
Patented Nov. 23, 1915.
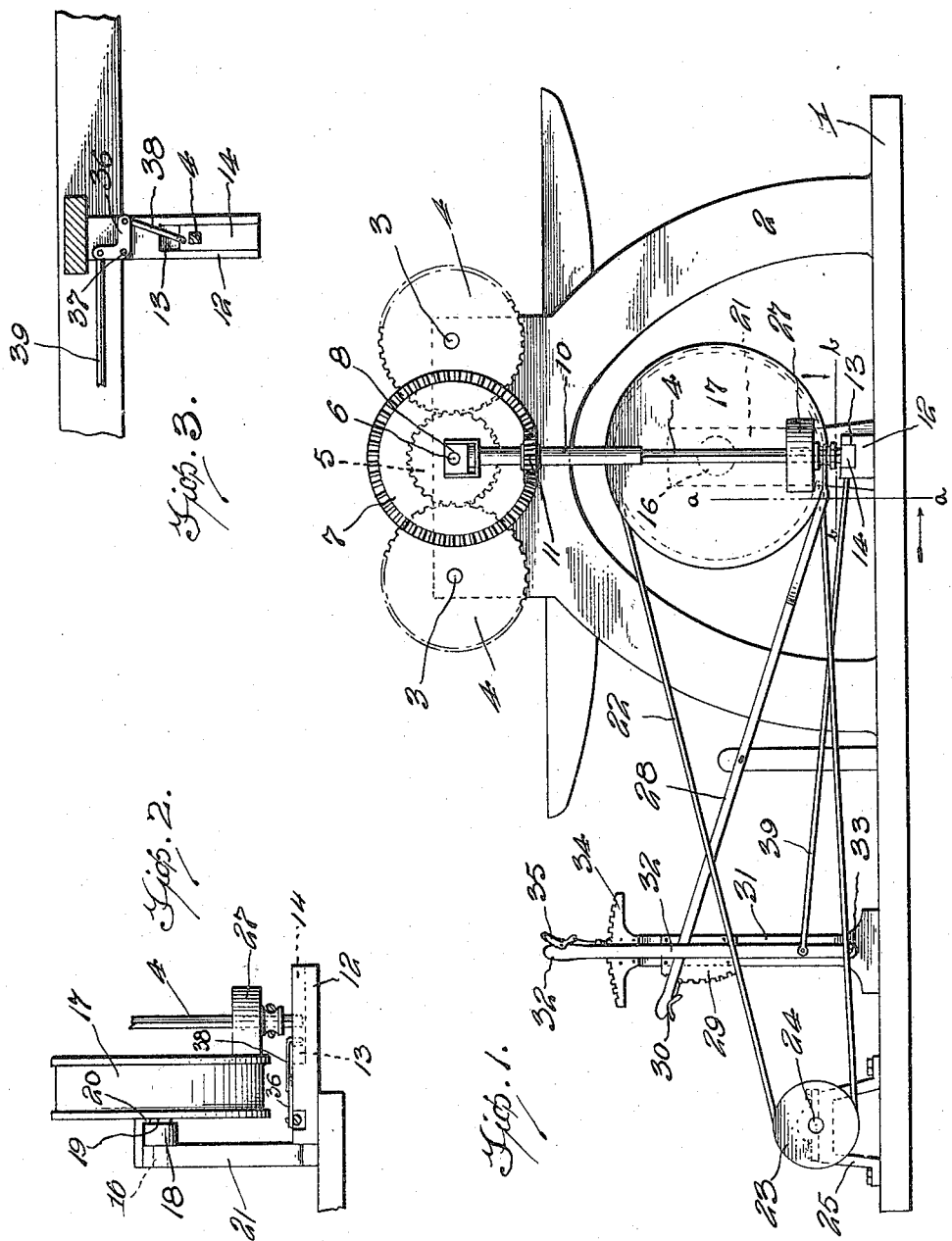
Inventor
John C. Bell.

UNITED STATES PATENT OFFICE.

JOHN C. BELL, OF SEVIERVILLE, TENNESSEE.

PLANER FEED-GEAR.

1,161,592.  Specification of Letters Patent.  Patented Nov. 23, 1915.

Application filed June 26, 1915. Serial No. 36,455.

*To all whom it may concern:*

Be it known that I, JOHN C. BELL, a citizen of the United States, residing at Sevierville, in the county of Sevier and State of Tennessee, have invented certain new and useful Improvements in Planer Feed-Gears; and I do hereby declare the following to be a full, clear, and exact description of the invention, such as will enable others skilled in the art to which it appertains to make and use the same.

This invention is an improved feed gear for planing machines, the object of the invention being to provide an improved feed gear of this character which is under constant control and which enables the machine to be stopped instantly in the event that the cylinder strikes a knot or other obstruction and which also enables a plank to be run back to release the cylinder when necessary and which also enables the speed of the machine to be varied as desired and without the necessity of stopping the machine.

The invention consists in the construction, combination and arrangement of devices hereinafter described and claimed.

In the accompanying drawings:—Figure 1 is a side elevation of a planing machine provided with a feed gear constructed in accordance with my invention. Fig. 2 is a detail vertical sectional view on the plane indicated by the line *a—a* of Fig. 1. Fig. 3 is a detail horizontal sectional view on the plane indicated by the line *b—b* of Fig. 1.

For the purposes of this specification a sill is indicated at 1 one side of a planing machine frame at 2, and the axle shafts of the feed rollers at 3.

In accordance with my invention I provide spur gears 4 which are secured each on one end of one of the feed roller shafts and these gears are engaged by a smaller gear 5 on a horizontally arranged stub shaft 6 which is secured to the frame 2, a beveled gear 7 being also provided which is connected to the gear 5 for rotation therewith. At the outer end of the stub shaft is a block 8 from which depends a substantially U-shaped bracket 9 which has a bearing for the upper end of a shiftable shaft 10, said shaft being vertically arranged and being provided with a beveled gear 11 which engages the gear 7.

The lower end of the shaft 10 is stepped in a bearing in a block 14 which is slidably mounted in a guideway 13 in an arm 12, which arm projects outwardly, horizontally, from the lower end of a standard 21 which is secured on the sill 1. The said standard has a stub shaft 16 on which a friction pulley 17 is mounted, said pulley having a hub 18 on its inner side provided with an annular groove 19 which groove is engaged by a finger 20 which depends from the bracket 21 on the upper end of said standard, said finger holding the friction pulley 17 on the stub shaft 16. The said friction pulley 17 is driven by a belt 22 from a pulley 23 on a countershaft 24, the bearings of said countershaft being indicated at 25. The outer face of the pulley 17 is a plane friction face. The shaft 10 has a friction wheel 27 which is slidably mounted on the non-circular portion of said shaft and for rotation therewith and is arranged opposite the friction face of the pulley 17 for engagement therewith and disengagement therefrom, the friction wheel 27 being shiftable radially on the said friction pulley 17.

A lever 28 is provided for shifting the friction wheel 27 radially of the friction pulley 17 and said lever may be locked at any desired adjustment by a segment 29 and a dog 30 the segment being arranged on a standard 31. A lever 32 is also pivotally mounted on said standard 31 as at 33 and may be secured in any desired adjusted position by a segment 34 and locking dog 35.

A bell crank 36 is pivotally mounted as at 37 on the arm 12 and has one of its arms connected by a link rod 38 with the shiftable block 14 the other arm of the bell crank being connected by a rod 39 with the lever 32. By operating said lever 32 the friction wheel 27 may be engaged with or disengaged from the friction face of the pulley 17. By operating the lever 28 the friction wheel 27 may be shifted on the friction pulley 17 radially so as to drive the shaft 10 and hence the feed rollers in either direction and at any desired rate of speed. By disengaging the wheel 27 from the friction pulley, which may be done instantly by means of the lever 32 and the connections hereinbefore described the planer can be instantly stopped. Hence the planer is under control at all times when in operation and should the cylinder strike a knot or some other obstruction the machine may be instantly stopped and injury avoided and when desired the plank can be run back a little to release the cylinder. Furthermore the planer can be run as slowly or as fast as may be desired.

While I have herein shown and described a preferred form of my invention I would have it understood that changes may be made in the form, proportion and construction of the several parts without departing from the spirit of the invention and within the scope of the appended claim.

Having thus described my invention, I claim:—

A feed gearing for a planing machine comprising a master gear for the feed rollers, a shiftable shaft having a gear engaging said master gear, a supporting guide, a shiftable block in said guide and forming a bearing for said shiftable shaft, a bell crank having one arm connected to said shiftable block, a lever, a connecting element between said lever and the other arm of the bell crank, a driving friction pulley, a friction wheel revoluble with and longitudinally adjustable on the shiftable shaft and arranged for engagement with and disengagement from the friction pulley and also for radial adjustment thereon, and a lever to shift said friction wheel.

In testimony whereof I affix my signature in presence of two witnesses.

JOHN C. BELL.

Witnesses:
GEORGE W. BURCHFIEL,
MITCHELL S. VALENTINE.

Copies of this patent may be obtained for five cents each, by addressing the "Commissioner of Patents, Washington, D. C."